Nov. 26, 1968 W. I. WOHLFELD 3,413,045
SEALED LUBRICATED REAMER-STABILIZER
Filed April 19, 1967 3 Sheets-Sheet 2

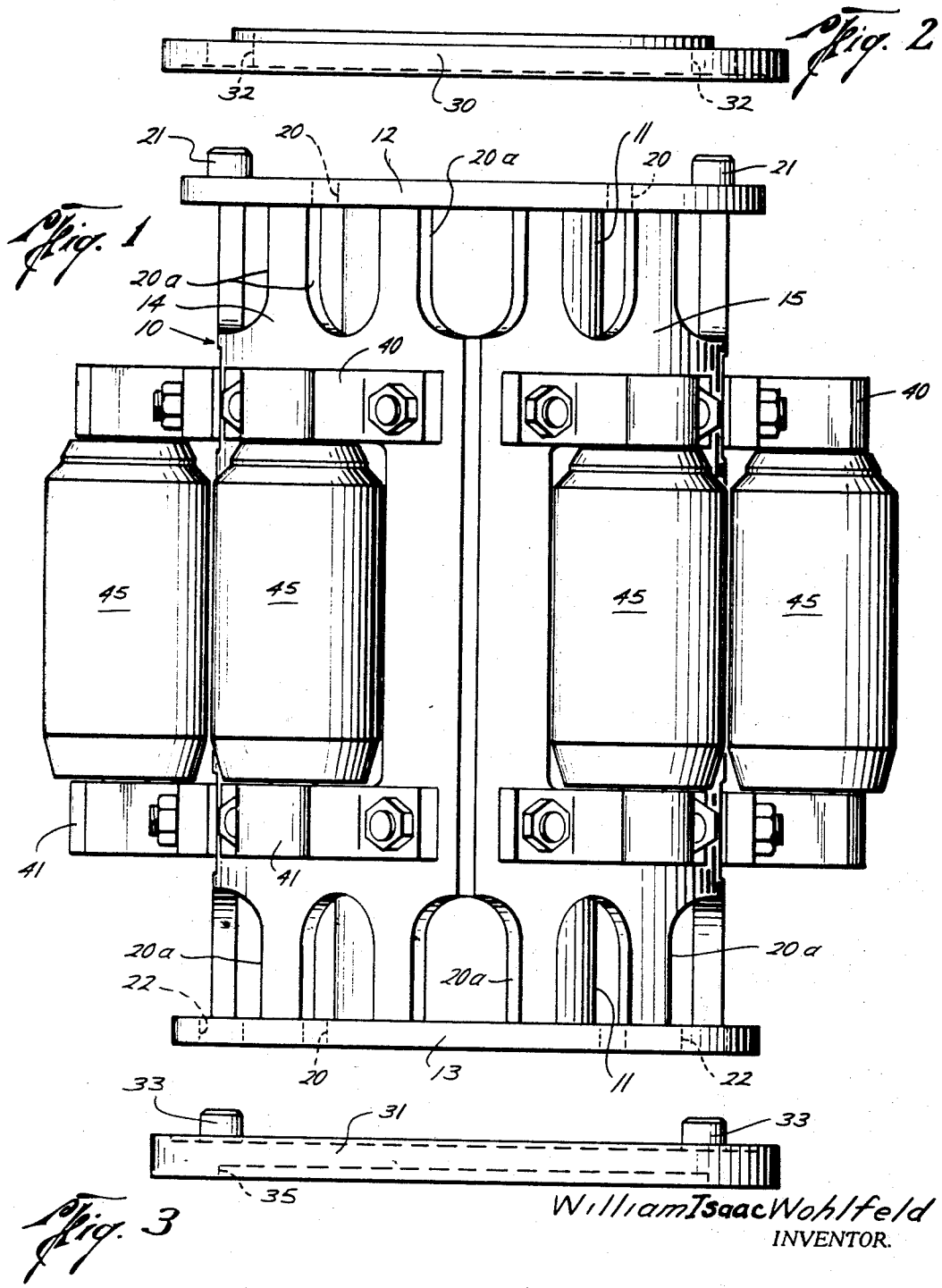

William Isaac Wohlfeld
INVENTOR.

BY Murray Robinson
ATTORNEY

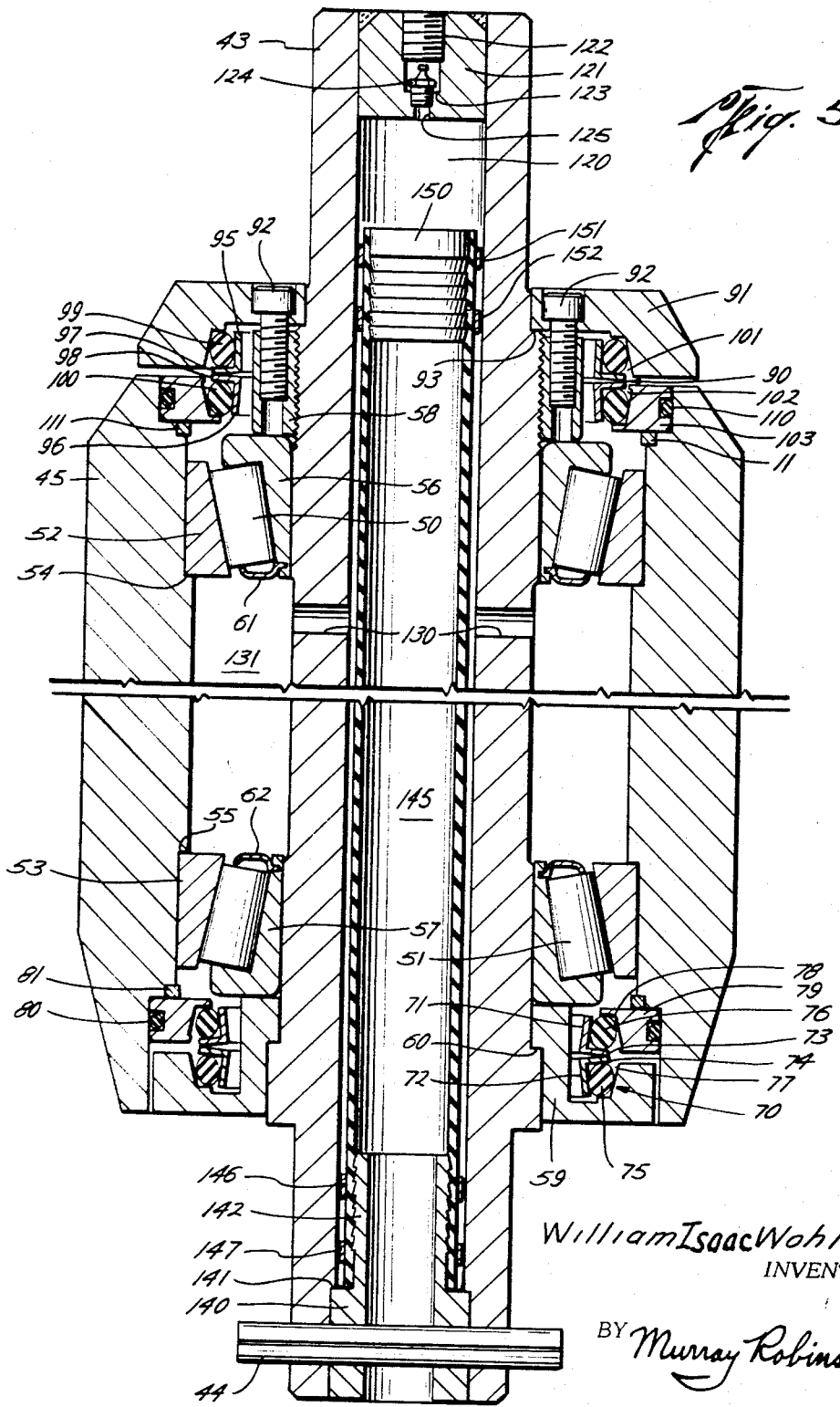

United States Patent Office 3,413,045
Patented Nov. 26, 1968

3,413,045
SEALED LUBRICATED REAMER-STABILIZER
William Isaac Wohlfeld, Midland, Tex., assignor to Smith Industries International Inc., a corporation of California
Filed Apr. 19, 1967, Ser. No. 632,099
4 Claims. (Cl. 308—6)

ABSTRACT OF THE DISCLOSURE

Metal roller of large hole reamer-stabilizer is rotatably mounted on hollow spindle carried by body of reamer-stabilizer. Tapered roller bearings mount roller on spindle. Hollow spindle provides grease reservoir communicating through radial ports in spindle and thence through annulus between roller and spindle with the bearings adjacent ends of roller and spindle. Floating, face-type, pressure seals between each end of roller and spindle beyond bearings prevent entrance of drilling fluid into bearings and loss of grease from bearings. Entrance of grease into reservoir is provided through check valve type grease gun collector in plug closing one end of hollow spindle. Other end of hollow spindle is closed by a plug having a port therethrough. The port is closed by an elastic, e.g. fabric reinforced elastomer tube extending into hollow spindle, the end of the tube remote from the port being closed. Grease pumped into reservoir through check valve collapses tube and fills hollow spindle with grease which is maintained under pressure by elasticity of tube. As grease is lost in use of apparatus, tube expands, moving grease from reservoir in spindle to the bearings. When apparatus is subjected to pressure of drilling fluid deep in an earth bore, volume reduction of grease due to increased pressure is compensated by expansion of tube and flow of grease from spindle to bearings, thereby preventing movement of external fluid past seals into bearings. Pressure across seals never exceeds initial pressure when reservoir filled since external fluid pressure on seal is balanced by internal fluid pressure of grease which in turn is subjected to external fluid pressure acting on tube.

Background of the invention

The invention relates to reamer-stabilizers of the general type shown in U.S. Patent No. 3,302,983 issued Feb. 7, 1967 to Drilco Oil Tools, Inc. on the application of W. R. Garrett. This type of stabilizer is primarily used in boring large diameter holes, e.g. elevator shafts for mines, which may be five or ten feet in diameter. An earth boring apparatus suitable for boring such large holes is shown in U.S. Patent 3,297,100 issued Jan. 10, 1967. As there shown, the drill collar for weighting the bit includes a fluid conduit on which are threaded one or more metal rings or weights. The subject reamer-stabilizer may be incorporated in such an apparatus in place of one of the weight rings, or at either end of the drill collar.

The rollers of the reamer-stabilizer shown in the aforesaid Garrett patent are made of rubber, which is a suitable material if the formation being bored is not too rough and a liquid drilling fluid is used which will lubricate the rubber rollers as they rotate on their metal spindles. If air is used as the drill fluid, self lubricated rollers are needed and this dictates the use of metal rollers. Reamer-stabilizers for air drilling incorporating self lubricated metal rollers have been sold by said Drilco Oil Tools, Inc.

In formation rough enough to cut-up rubber rollers, metal rollers are called for regardless of the nature of the drilling fluid, and a metal roller needs self lubrication for long life. When self-lubricated rollers are used, the bearings need to be sealed to exclude detritus formed in the earth bore. However when liquid is present in the bore, it has been found that the hydrostatic pressure causes the well liquid to pass through the seals and spoil the bearings. It is to the solution of this problem that the present invention is directed.

A somewhat similar problem exists in connection with lubrication of the bearings for roller cutter rock bits used to drill oil wells. The problem there is the change of volume of the bearing lubricant space as the parts vary in position in use. Volume compensating means for a rock bit lubricant reservoir are disclosed in U.S. Patents 3,007,-750 and 3,007,751 issued Nov. 7, 1961. However in neither of these patents is the problem of hydrostatic pressure of the well fluid considered. Also, the constructions shown in these patents are intended for use with a liquid lubricant which feeds to the bearings by gravity. According to the present invention, means is provided for feeding the lubricant under pressure without reliance upon gravity, thereby making possible the use of a grease type lubricant and eliminating the need for the lubricant reservoir to be mounted at a higher elevation than the bearings to be lubricated. Furthermore, the present invention is structurally well adapted for use with a roller reamer-stabilizer used for large bores.

Summary of the invention

According to the invention a lubricant reservoir is formed between the inside of the hollow spindle on which the roller rotates and the outside of an elastic tube disposed inside the spindle, the inside of the tube being exposed to well fluid and the reservoir being in communication with the bearing space, the bearing space being sealed off from the well fluid by pressure seals.

Brief description of the drawings

For a detailed description of a preferred embodiment of the invention reference will be made to the accompanying drawings wherein FIGURE 1 is an elevation showing a reamer-stabilizer in which the invention is incorporated;

FIGURES 2 and 3 are elevations of top and bottom adapter plates to be used with the reamer-stabilizer when it is mounted on a drill collar between the weight rings thereon;

FIGURE 5 is a vertical section through one of the rollers of the reamer-stabilizer shown in FIGURES 1 and 2.

Description of preferred embodiment

Figure 4:
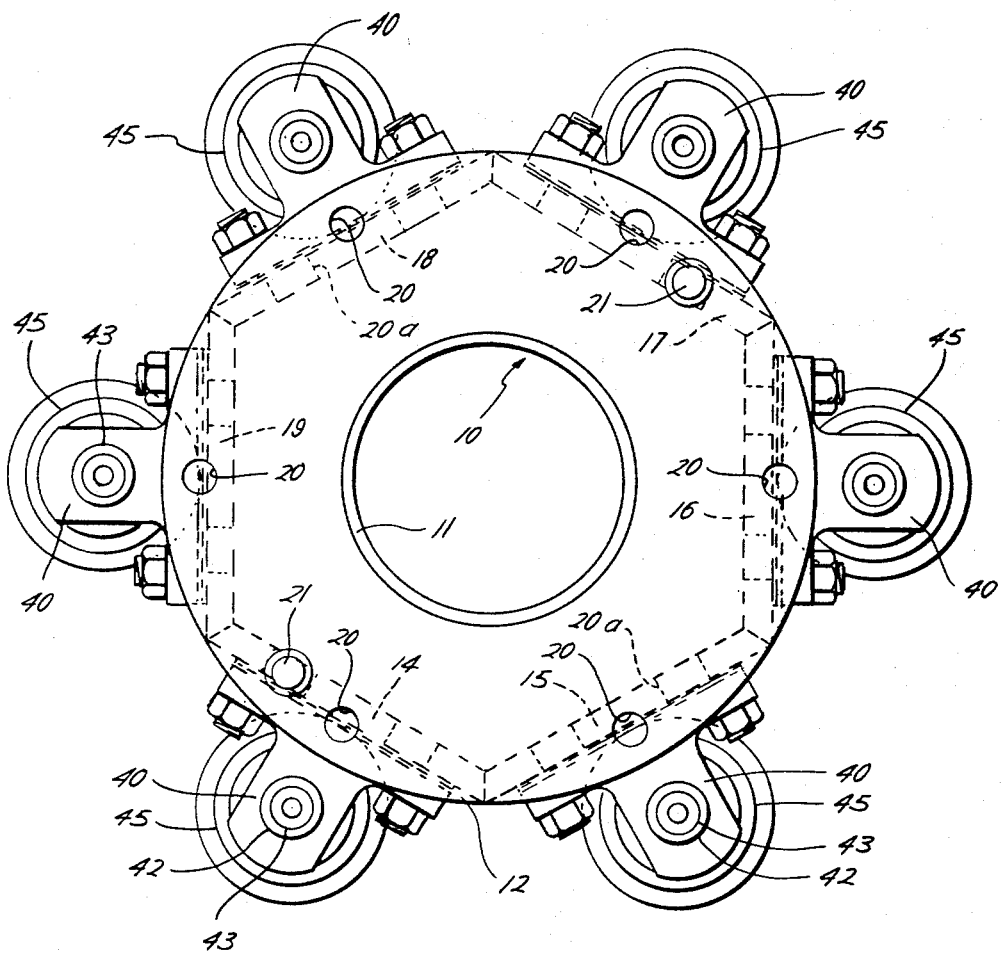
FIGURE 4 is a plan view of the reamer-stabilizer shown in FIGURE 1.

Referring to FIGURES 1 and 4 there is shown a reamer-stabilizer including a body 10 comprising a central tube 11 to the ends of which are welded centrally apertured circular flanges 12 and 13. Body 10 further comprises six hexagonally disposed vertical plates 14, 15, 16, 17, 18, 19, welded to the flanges 12, 13 and to each other. The discs 12, 13, are provided with bolt holes 20 whereby the reamer-stabilizer can be bolted between the drill bit flange and drill collar bottom flange. To facilitate access to the nuts and bolts, apertures 20A are formed in plates 14–19.

Alignment or guide pins 21 on top flange 12 and alignment or guide sockets 22 in the bottom flange are adapted to cooperate with correlative sockets on the drill collar flange and correlative pins on the drill bit flange.

If it is desired to thread the reamer-stabilizer over the drill collar and dispose it between the weight rings ("donuts") thereon, adapter plates 30, 31, shown in FIGURES 2 and 3, may be placed next to the flanges 12, 13 of the reamer-stabilizer. Plate 30 has sockets 32 adapted to receive pins 21. Plate 31 has pins 33 adapted to be received by sockets 22. Plate 30 has an annular bead or dowel 34 adapted to enter a correlative socket in a donut thereabove, to prevent lateral shifting and maintain concentricity. Plate 31 has an annular groove or socket 35 adapted to receive a correlative annular bead or dowel on the donut therebelow, or on the top of the drill collar flange.

Referring again to FIGURES 1 and 4 to the outside of each of the plates 14–19 is bolted a pair of upper and lower brackets 40, 41. Each bracket has an aperture 42 receiving one end of a spindle 43 (see also FIGURE 5). Each spindle is retained in position and prevented from turning by a roll pin 44 driven transversely through the lower bracket 41 and the lower end of spindle 43. Rollers 45 are rotatably mounted on spindles 43 as will be described in greater detail hereinafter with reference to FIGURE 5. The rollers 45 are preferably made of metal, such as steel, with generally cylindrical outer peripheries. The outer periphery of each roller may be smooth, or coated with tungsten carbide pellets, or provided with some toothed or other contoured surface configuration such as shown for example in the 1966–67 edition Composite Catalog of Oil Field Equipment and Services at page 1602, "Model 60 Reamer Cutters."

Referring now to FIGURE 5, each roller 45 is rotatably mounted on its spindle 43 by means of tapered upper and lower roller bearings 50, 51. The outer races 52, 53 of the bearings bear against shoulders 54, 55 respectively, so that thrust loads in both directions, up and down, are transmitted from the roller to the bearings, as well as radial loads. The thrust transferred to the inner races 56, 57 is taken respectively by nut 58 screwed onto the upper end of the spindle and retainer 59 which bears on shoulder 60 on the spindle. Keepers 61, 62 retain the rollers on the inner races.

Retainer 59 is shrink fitted on spindle 43, and could be made integral therewith if desired. Between retainer 59 and roller 45 is a face-type pressure seal means 70 of the general type disclosed in U.S. Patents 2,710,206, 3,073,689, and 3,180,648. The seal means 70 includes two metal rings 71, 72 having radial flanges 73, 74 in face to face contact under the pressure of elastomer O-rings 75, 76. O-ring 75 is supported by downwardly converging tapered seat 77 on retainer 59. O-ring 76 is supported by upwardly converging tapered seat 78 on retainer 79. Retainer 79 is sealed to roller 43 by O-ring 80 and prevented from rotating relative to roller 43 by means of dowel pins 81 received in correlative sockets in the roller.

A face-type pressure seal means 90, similar to seal means 70, seals between roller 45 and a cup 91 secured to nut 58 by cap screws 92. Cup 91 bears against shoulder 93 creating a friction lock to prevent nut 58 from unscrewing. Seal means 90 includes two metal rings 95, 96 each having a radial flange 97, 98. The flanges 97, 98 are in face to face contact under the pressure of O-rings 99, 100. O-ring 99 bears against upwardly converging tapered seat 101 on cap 91. O-ring 100 bears against downwardly converging tapered seat 102 on retainer 103.

Retainer 103 is sealed to roller 45 by O-ring 110 and is held against rotation relative to roller 45 by dowel pins 111 received in correlative sockets in roller 45.

Spindle 43 is hollow, being generally tubular, providing a space 120 serving as reservoir for a lubricant. While the lubricant may be any suitable fluid, liquid or plastic solid, the construction is adapted for use with a grease such as the product sold under the tradename "Litholine" by Sinclair Refining Company, which is a lithium base grease.

The upper end of tubular spindle 43 is closed by a plug 121 welded in place. Plug 121 has a threaded bore 122 in the lower end of which against a shoulder 123 is secured a check valve 124. Check valve 124 opens into reservoir 120 through port 125 and is a conventional fitting adapted for connection to a grease gun whereby grease may be pumped under pressure into reservoir 120. Grease flows under pressure from reservoir 120 through radial ports 130 into the annulus 131 between the roller and spindle and thence to the bearings 50, 51. Seals 70 and 90 beyond the bearings prevent the grease from leaking out between the ends of the roller and the spindle.

The lower end of the tubular spindle receives a tubular plug 140 which is held in place against shoulder 141 on the spindle by roll pin 44. An externally serrated nipple 142 extends upwardly from plug 140. A flexible elastic tube 145 is secured at one end around nipple 142 by steel bands 146, 147. Also, the tube is secured to nipple 142 by an epoxy cement. The tube and nipple are thereby connected in fluid tight relationship. The upper end of tube 145 is similarly connected to an externally serrated steel plug 150 by epoxy cement and steel bands 151, 152.

Tube 145 is preferably a fabric reinforced neoprene rubber tube similar to a hose connection for an automobile radiator. The tube should be oil and water resistant. A durometer hardness in the range of 30 to 70 on the Shore A scale is suitable.

In place of tube 145 one could use a piston sliding inside the tubular spindle and biased upwardly by a helical spring. Or an elastic metal bellows could be substituted, the upper end of the bellows being closed and the lower end sealed to the lower end of the tubular spindle. Whatever form of resilient wall means is used, be it an elastic tube, spring loaded piston, or elastic metal bellows, to close the lower end of tubular spindle 43, when reservoir 120 is filled with grease under pressure the resilient wall means will collapse, enlarging the reservoir space. After the reservoir has been filled with lubricant the resilient wall means will maintain the lubricant under pressure despite loss of lubricant due to wear and despite volume reduction due to hydrostatic pressure.

In addition, the resilient wall means prevents entrance of drilling fluid past seals 70 and 90 upon volume reduction of the grease due to hydrostatic pressure. This is due to the fact that a predetermined substantial pressure differential, e.g. 50 p.s.i., is necessary to part the face seals 70, 90 to let in drilling fluid, whereas the slightest increase in pressure on the resilient wall means, e.g. pressure increase inside tube 145 admitted through tubular plug 140, will cause the resilient wall means to move to reduce the reservoir volume and elevate the lubricant pressure. This would not be so if a greater pressure differential were required to move the resilient wall means than to cause leakage past the seal means. It is apparent therefore that a characteristic of the invention is the use of pressure seals having a higher breakdown pressure differential than the pressure differential needed to move the resilient wall means to reduce the reservoir volume.

It is also to be noted that the pressure seals should release at not too high a pressure so that the grease or other lubricant pressure can not accidentally be built up so high as to cause mechanical distortion or other damage to the parts.

Although the pressure seals may have a fairly low relief or breakdown pressure differential, so long as it is appreciably higher than the pressure differential needed to move the resilient wall means of the reservoir, nevertheless there is no danger of external fluids entering through the seal means, for the pressure differential across the seal means is maintained outwardly directed by the elastic force of the tube 145 or other resilient wall means and is maintained substantially equal to that due to said elastic force, for external fluid pressure acts not only on the outside of each seal means but indirectly on the inside thereof, being transferred to the grease through the movable wall means.

The face type pressure seal means 70 and 90 have a higher capability of withstanding pressure differential than is recommended for the usual lip type seal. About 15 p.s.i. is as high a pressure differential as can be sealed against with an ordinary lip seal without creating undue wear. The disclosed metal-to-metal face type seals are therefore of special advantage in the present invention since they can be made satisfactorily to seal against pressure differentials up to 50 p.s.i.

Another element of the subject reamer-stabilizer which is of advantage is the secondary reservoir for grease formed by the annular space 131 between the roller and spindle. The grease in this annulus can flow by gravity to the lower thrust bearings 51 insuring some lubrication even if the pressure lubricating system including the elastic tube 145 should fail. In ordinary use when the drill is boring an on-gage hole and the reamer-stabilizer is doing little reaming, or when the drill even though under-gage is not progressing too rapidly, most of the roller weight will be on the lower thrust bearings. Since the roller weight may be of the order of two hundred pounds, the wear on the lower thrust bearing is significantly higher than on the upper thrust bearing. The insurance of a supply of lubricant to the lower thrust bearing which assurance is provided by the annulus reservoir 131, is therefore of advantage.

It has been stated previously that the lubricant should be a fluid, that term being understood to include both liquid and materials in a plastic condition. In this regard reference may be made to consistency numbers, a standard set up by the National Grease Institute. Consistency numbers run from 0 through 5, referring to semi-liquid, soft, medium, medium hard, hard, and very hard. Typically the lubricant of the present invention will have a consistency number of the order of 1 or 2, corresponding to soft or medium, to facilitate flow without rendering filling and sealing difficult. Such a grease is sufficiently flowable to move under gravity whereby the lower thrust bearing will be lubricated even without the aid of pressure imposed by elastic tube 145.

It would be difficult, however, to provide the annulus reservoir with a resilient-wall means for pressure lubrication and pressure compensation. The primary axial reservoir 120 with resilient wall means in the form of tube 145 takes care of the latter requirements.

It is to be noted that the total volume of grease may be of the order of 3 gallons, of which 0.3 gallons may be in the primary reservoir 120 and 2.7 gallons in the secondary reservoir 131. The compression of this volume of grease under a hydrostatic pressure of 1500 feet of 10 lb./gal. mud may be of the order of 0.04 cu. inches. The volume change in the primary reservoir between full collapse of tubes 145 and full expansion thereof is of the order of 75 cu. in. which is more than adequate to compensate for grease shrinkage at great depths. The excess volumetric change capacity provided by the primary reservoir is desirable to take care of ordinary loss of the grease during use of the reamer-stabilizer and to compensate for or allow for purging of air which may be entrapped in the lubricant system, which would reduce in volume a much greater amount when the external pressure is increased.

The elastic tube 145 has a relatively low elastic modulus so that it will collapse under a few pounds per square inch pressure differential and will force grease into voids occasioned by shrinkage or purging of entrapped air when the reamer-stabilizer is subjected to the pressure of drilling fluid, whether hydrostatic or due to the action of pumps.

Generally speaking, it may be stated that the invention contemplates a primary lubricant reservoir disposed axially of each reamer-stabilizer roller spindle, the reservoir having a resilient wall means to effect equalization of pressure increase inside and outside the seals of the lubricant system and to compensate for volume changes in the lubricant system due to external pressure changes, to compensate for loss of air due to purging upon increase of external pressure, and to compensate for loss of lubricant through wear. Pressure seals enable the resilient wall means to maintain a positive outward pressure differential. A secondary gravity feed reservoir assures lubrication of the lower thrust bearing in the event of difficulty with the pressure feed of the lubricant by the resilient wall means. The resilient wall means provides lubrication for the upper as well as the lower thrust bearing without the necessity of disposing a gravity feed reservoir above the upper bearing.

While a preferred embodiment of the invention has been shown and described and several alternative constructions mentioned, many other modifications can be made by one skilled in the art without departing from the spirit of the invention.

I claim:

1. A reamer-stabilizer subassembly comprising a spindle, a roller, upper and lower bearing means rotatably mounting the roller on the spindle, the lower bearing means including means to take downwardly directed thrust, said upper and lower bearing means being separated axially and said roller being spaced radially from said spindle, seal means sealing between the roller and the spindle at positions nearer the ends of said roller than said bearing means, the annulus defined between said spindle and roller and closed at its ends by said seals providing a lubricant reservoir, grease in said reservoir feeding by gravity to said lower bearing means, and flow passage means extending from said annulus reservoir through said spindle to an inlet accessible from the exterior of said subassembly adapted to be connected to a lubricant pump, said subassembly being characterized by including further a primary reservoir in said flow passage means, said primary reservoir including a resilient wall means exposed on the side thereof opposite the interior of said primary reservoir to the same fluid pressure as exists outside said subassembly, said seal means being effective to seal against pressure differentials in excess of that required to move said resilient wall means, and inwardly opening check valve means in said flow passage means between said primary reservoir and said inlet.

2. A reamer-stabilizer subassembly comprising a spindle, a roller, bearing means rotatably mounting the roller on the spindle, and seal means sealing between the roller and the spindle at positions nearer the ends of said roller than said bearing means, and flow passage means to admit lubricant to the bearing means, characterized as follows:

said subassembly includes a lubricant reservoir in communication with said flow passage means, said reservoir includes resilient wall means exposed to fluid pressure exterior to said subassembly, said seal means seal against a pressure differential acting from outside said subassembly inwardly toward said bearing means that is greater than the pressure differential necessary to move said resilient wall means to reduce the volume of said reservoir.

3. A reamer-stabilizer subassembly in accordance with claim 2 wherein said spindle is of generally tubular configuration closed at one end, the other end of said spindle receiving a flexible elastic tube extending coaxially into said spindle, one end of said tube being sealed to said other end of said spindle, the other end of said tube being closed, the chamber between the inside of the spindle and the outside of the tube forming said reservoir and said tube providing said resilient wall means.

4. Combination according to claim 3 wherein said seal means are of the metal-to-metal face type including elements having cooperating radially extending relatively rotatable surfaces adapted to open upon pressure differential thereacross exceeding a predetermined value and reclose when the pressure differential falls below that value.

References Cited
UNITED STATES PATENTS 3,302,983   2/7/67   Garrett _____ 308—4

MARTIN P. SCHWADRON, *Primary Examiner.*

FRANK SUSKO, *Assistant Examiner.*